UNITED STATES PATENT OFFICE.

HARRY S. MORK, OF BROOKLINE, MASSACHUSETTS, ASSIGNOR, BY MESNE ASSIGNMENTS, TO AMERICAN LA FRANCE FIRE ENGINE COMPANY, INC., OF ELMIRA, NEW YORK, A CORPORATION OF NEW YORK.

FIRE-EXTINGUISHER COMPOSITION.

1,278,714.     Specification of Letters Patent.     Patented Sept. 10, 1918.

No Drawing.     Application filed January 14, 1918. Serial No. 211,333.

*To all whom it may concern:*

Be it known that I, HARRY S. MORK, a citizen of the United States, residing at Brookline, county of Norfolk, State of Massachusetts, have invented a certain new and useful Fire-Extinguisher Composition, of which the following is a specification.

My invention relates to fire extinguisher charges and more particularly to the carbonate solution from which carbon dioxid for expelling the extinguishing medium is generated by reaction with a suitable acid. Potassium carbonate has already been employed for such solutions, while sulfuric acid or hydrochloric acid has usually been employed, as the acid charge. In order that the carbonate solution may always remain in a condition suitable for use even when exposed to low temperatures, it has been proposed to incorporate in the carbonate solution, an ingredient for lowering the freezing point thereof. Most of these ingredients which have been heretofore proposed for this purpose are subject to one disadvantage or another. In some instances, the addition agent tends to give rise to the formation of a precipitate of insoluble carbonate or other salt or to retard the generation or evolution of the carbon dioxid gas; or its effect in small quantities has not been sufficiently marked in depressing the freezing point.

The object of my invention is to produce a carbonate solution charge of the desired low freezing point which shall be free from the disadvantages above noted. At the same time, the invention seeks to avoid the use of ingredients which might involve undue expense, or which would in any way interfere with the fire extinguishing qualities of the medium which is to be ejected from the apparatus.

The carbonate solution embraced by my present invention, comprises as essential ingredients, potassium carbonate or bicarbonate and an alkali metal lactate, preferably, sodium lactate. These essential ingredients may be dissolved for example, in water.

In order to clearly illustrate the invention, I shall describe a specific embodiment thereof.

A solution in which potassium carbonate is employed with sodium lactate, may have a freezing point of as low as $-85°$ F. approximately. Such a freezing point is attained for example, by a solution made up of 4.54 grams of potassium carbonate and 66 grams of sodium lactate in 100 cubic centimeters of water. This solution retains its fluid state down to a temperature of about $-35°$ F., but gradually becomes more and more viscous as the temperature becomes lower.

The gas evolution is materially improved by the presence of the sodium lactate in the potassium carbonate solution, as will appear from a comparison of the rate of evolution in the two solutions. A test quantity of 15 cubic centimeters at $20°$ C. from a solution made up of 4.54 grams of potassium carbonate in 100 cubic centimeters of water, when treated with 1 c. c. of sulfuric acid of sufficient strength to neutralize two thirds of the carbonate, showed a gas evolution of approximately $32\frac{1}{4}$ cubic centimeters at the end of one minute, $33\frac{1}{4}$ cubic centimeters at the end of two minutes, $34\frac{1}{2}$ cubic centimeters at the end of three minutes, 35 cubic centimeters at the end of the fourth minute, and no further increase at the end of the fifth minute. This same test quantity of fifteen cubic centimeters at the same temperature, from a solution made up of 4.54 grams of potassium carbonate and 66 grams of sodium lactate in 100 cubic centimeters of water, when treated with the same proportions of acid, showed a gas evolution of approximately $39\frac{1}{4}$ cubic centimeters at the end of one minute, $40\frac{1}{2}$ cubic centimeters at the end of two minutes, $41\frac{1}{2}$ cubic centimeters at the end of three minutes, 42 cubic centimeters at the end of four minutes, and no further increase at the end of the fifth minute.

Potassium carbonate and potassium lactate may be advantageously employed in, for example, the proportions of 5.54 grams of potassium carbonate and 75.6 grams of potassium lactate in 100 c. c. of water. Such a solution shows a freezing point below $-70°$ F. and gives a good evolution of carbon dioxid upon being treated with acid. Good properties are also exhibited by a solution of 6.6 grams potassium bicarbonate with 30.4 grams sodium lactate or 70 grams potassium lactate in 100 c. c. of water.

The above compositions may be employed with good effect for the extinction of fire.

It will, of course, be understood that the precise proportions given above by way of example may be departed from when desired, these proportions being intended rather to indicate the marked effect of the alkali metal lactate in depressing the freezing point. The composition is employed in practice by reaction with a suitable acid as, for example, hydrochloric acid or sulfuric acid in a fire extinguisher, whereby carbon dioxid is generated and expels by its pressure, the contents of the extinguisher.

I claim:

1. A carbonate solution for fire extinguishers, comprising as essential ingredients, a potassium salt of carbonic acid and an alkali metal lactate.

2. A carbonate solution for fire extinguishers, comprising as essential ingredients, potassium carbonate and an alkali metal lactate.

3. A carbonate solution for fire extinguishers, comprising as essential ingredients, a potassium salt of carbonic acid, and sodium lactate.

4. A carbonate solution for fire extinguishers, comprising as essential ingredients, potassium carbonate and sodium lactate.

5. A carbonate solution for fire extinguishers, comprising as essential ingredients, potassium carbonate and sodium lactate, substantially in proportions of 4.54 grams of potassium carbonate and 66 grams of sodium lactate in 100 cubic centimeters of water.

HARRY S. MORK.